United States Patent [19]
McFalls et al.

[11] 3,882,588
[45] May 13, 1975

[54] METHOD FOR HANDLING TIE RODS ON AN INJECTION MOLDING MACHINE

[75] Inventors: Patrick M. McFalls, Rockford, Ill.; David W. McCarty; Robert B. Hare, both of Beloit, Wis.

[73] Assignee: Beloit Corporation, Beloit, Wis.

[22] Filed: May 14, 1973

[21] Appl. No.: 359,691

[52] U.S. Cl. .................... 29/427; 29/526; 425/190
[51] Int. Cl. ............................................ B23p 19/02
[58] Field of Search........ 425/190, 192, 450, 450 C; 29/427, 239, 526

[56] References Cited
UNITED STATES PATENTS

| | | | |
|---|---|---|---|
| 2,879,545 | 3/1959 | Bailey | 425/450 |
| 3,158,903 | 12/1964 | Fischer et al. | 425/450 |
| 3,327,377 | 6/1967 | German | 29/427 |
| 3,743,469 | 7/1973 | Gibbons | 425/450 |
| 3,802,057 | 4/1974 | Porter | 29/427 |

*Primary Examiner*—Robert D. Baldwin
*Assistant Examiner*—John McQuade
*Attorney, Agent, or Firm*—Larson, Taylor and Hinds

[57] ABSTRACT

A method and apparatus for removing and re-installing tie rods on an injection molding machine. To remove a given tie rod, the ends thereof are disconnected from the stationary platen and the cylinder base plate and a releasable clamp is secured tightly onto the tie rod on the side of the movable platen facing the cylinder base plate, whereupon the movable platen is moved toward the cylinder base plate, pushing the clamp which in turn carries the tie rod with it. If this procedure does not move the tie rod enough to provide sufficient clearance into the space between the platens, a clamp is then secured on the tie rod on the side of the cylinder base plate opposite from the platens and the movable platen is then slid along the given tie rod back toward the stationary platen, after which the above described procedure is repeated for moving the tie rod an additional amount away from the stationary platen. To re-install the rods, the procedure is reversed except that when re-installing, the tie rod is clamped on the sides of the cylinder base plate and of the moving platen facing toward the stationary platen. A hydraulic torque wrench may be used for proper torquing and detorquing of the nuts connecting the tie rod ends to the stationary platen and the cylinder base plate.

13 Claims, 20 Drawing Figures

3,882,588

METHOD FOR HANDLING TIE RODS ON AN INJECTION MOLDING MACHINE

BACKGROUND OF THE INVENTION

This invention relates to the mold clamping unit of an injection molding apparatus, and in particular it relats to the removal and re-installation of the tie rods associated with the mold clamping unit.

In an injection molding apparatus there is provided a stationary platen and a stationary cylinder base plate which are interconnected by a plurality of tie rods. A movable platen is mounted therebetween for sliding movement along the tie rods. The mold halves themselves are mounted on facing surfaces of the stationary and moving platens. power for moving the movable platen is normally supplied by a hydraulic cylinder fixedly mounted with respect to the cylinder base plate. When installing or removing the mold halves onto or off of their respective facing surfaces of the moving and stationary platens, it is often necessary to pull at least one tie rod back to provide a greater access to the space between the platens. The provision of such additional clearance is necessary even when using relatively small mold halves which might fit between the tie rods to provide sufficient access for the equipment and tools necessary to attach and remove the mold halves to and from the platen surfaces.

There are several disadvantages to the presently known methods and arrangements for removing and re-installing these tie rods. One disadvantage is that presently known methods and arrangements tend to be quite complicated. For example, they might involve highly complex screw threaded arrangements which hold the tie rod at one end and which are operable to move the tie rod longitudinally via a screw threaded engagement therewith. Another disadvantage of many known methods and arrangements is that they move the tie rod longituninally only a portion of the distance between the platens. That is, while some access is provided around the end of the removed tie rod between the platens, nonetheless the end portion of the removed tie rod still projects partially into this space, thus making it quite difficult to remove and install the mold halves, especially the mold half associated with the movable platen. This problem is further complicated in the situation where very large mold halves are used since they require maximum access to the space between the platens for insertion and removal thereof.

Another problem associated with tie rods is to provide the correct torque on the tie rod nuts when connecting them to the apparatus. It is known that these tie rod nuts must be connected with a proper amount of torque in order to operate properly. However, with presently known arrangements for loosening (detorquing) the tie rods nuts for removable thereof and then retightening (retorquing) of the tie rod nuts after re-installation thereof, it is most difficult, if not impossible, to provide just the right degree of torque.

Consequently, there exists a need for a new and improved arrangement and procedure for pulling back and re-installing tie rods which is more simplified than presently known techniques and which will provide greater access to the space between the platens. Further, there is a need for an improvement in the task of loosening and retightening the tie rod nuts before and after the tie rod removal and re-installation procedure, which improvement will result in the right amount of torque being applied to the tie rod nuts after retightening thereof.

SUMMARY OF THE INVENTION

Thus, it is a purpose of the present invention to provide a new and improved clamping unit and method of operating the same for injection molding machines which will overcome the problems associated with clamping units known heretofore.

In accordance with the present invention, the task of improving the tie rod removal and re-installation procedure includes the use of relatively simple releasable clamps which are connected to the tie rod to be removed at strategic locations whereby the existing main hydrualic cylinder of the apparatus provides the power for removing the tie rod.

For removing, i.e., pulling back the tie rod, the nut at the end thereof adjacent the stationary platen is removed. The nut at the cylinder base plate end is then either loosened or removed, and then split ring 34 is removed. A clamp is then placed onto the tie rod just behind the movable platen. At this time, the movable platen is preferably in the forwardmost, closed position. The main cylinder is then operated to pull the movable platen towards it, the movable platen engaging the said clamp which in turn pulls the tie rod with the movable platen. After the movable platen has been retracted for the full stroke of the cylinder, at least a portion of the removed tie rod will still extend into the space between the platens. Consequently, to pull back the tie rod by an additional amount the above described clamp is loosened and a clamp (either the same clamp or a separate clamp) is now placed on the removed tie rod just behind the cylinder base plate (i.e., on the side thereof away from the platens). The hydraulic cylinder then moves the movable platen which slides along the removed tie rod back towards the stationary platen. When the cylinder rod has been fully extended, the initial procedure is repeated, i.e. the tie rod is not clamped again immediately behind the movable platen. However, it is evident that the clamp is now secured on the tie rod much closer to the end thereof than during the initial clamping thereof. The movable platen is then retracted again to pull the tie rod back an additional amount. Because practical considerations such as the thickness of the mold halves may limit the stroke of the hydraulic cylinder, even after the second retraction of the movable platen, the tie rod may not have been pulled back enough. In this case the above described procedure is simply repeated until the tie rod has been pulled back a sufficient amount to provide the necessary clearance between the platens.

The procedure is essentially reversed for re-installing the tie rod, i.e., returning it to the stationary platen. while this reverse procedure will be self-evident from the above, it might just be noted that in the reverse procedure the tie rod is clamped on the opposite side of the movable platen and the cylinder base plate, i.e. on the sides thereof facing the stationary platen, and in other respects the steps are essentially the reverse of the pulling back procedure.

In accordance with another feature of the present invention, the ends of the tie rods connected to the cylinder base plate and the stationary platen are adapted for use with a hydraulic torque wrench (which is known per se) whereby detorquing and torquing of the tie rod nuts can be carefully controlled.

It is another object of this invention to provide a new and improved method for removing and re-installing tie rods in injection molding machines.

It is another object of this invention to provide a new and improved method for removing and re-installing a tie rod in an injection molding machine which are simplified with respect to prior known methods and arrangements and which utilize the power of the main hydraulic piston and cylinder unit of the clamping unit to effect movement of the tie rod.

It is another object of this invention to provide a method and arrangement for carefully controlling the torque applied to the tie rod nuts when connecting the same.

Other objects of the advantages of the invention will become apparent from the detailed description to follow, together with the accompanying drawing.

BRIEF DESCRIPTION OF THE DRAWINGS:

There follows a detailed description of a preferred embodiment of the invention to be read together with the accompaning drawings in which.

DETAILED DESCRIPTION OF THE PREFERRED EMBODIMENT

Figure 1:
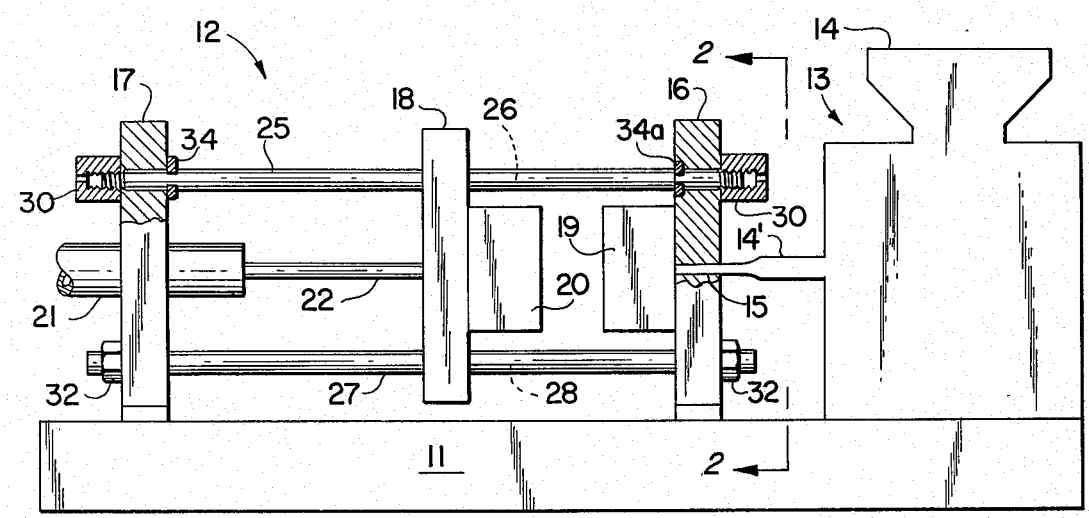
FIG. 1 is s side elevation view of an injection molding machine showing a clamping unit including the features of the present invention with a portion thereof shown in section to reveal details thereof and showing the remaining portions of the injection molding machine only schematically.

Referring now to the drawings, like elements are represented by like numerals throughout the several views.

FIG. 1 illustrates schematically an injection molding apparatus having a base 11, a clamp and mold area 12 and an injection unit 13. Unit 13 is shown schematically and includes a hopper 14 for introducing the plastic material, a barrel 14' and an injection nozzle 15 through which the plasticized material is injected into the mold.

The mold area 12 includes a stationary platen 16, a cylinder base plate 17 and a movable platen 18. A pair of mold halves 19 and 20 are mounted on platens 16 and 18, respectively. The platen 18 is movable towards the platen 16 to close the mold halves 19 and 20 onto each other by means of a hydraulic clamping cylinder 21, the piston rod 22 of which engages the platen 18. When the mold halves are closed, the material injected from nozzle 15 passes directly into the rear of mold half 19 and hence into the cavity formed by the closed mold halves 19 and 20.

Figure 2:
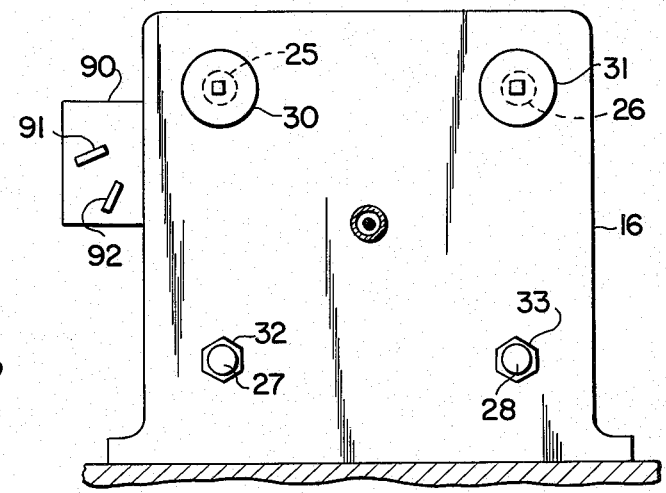
FIG. 2 is a cross-sectional view taken along line 2—2 of FIG. 1.

The movable platen 18 is supported for longitudinal movement on a set of tie rods. Referring also to FIG. 2, the present embodiment includes two upper tie rods 25 and 26 and two lower tie rods 27 and 28. The tie rods 25 and 27 are visible in FIG. 1 while the other tie rods 26 and 28 are located (as viewed in FIG. 1) behind the tie rods 25 and 27.

During operation of the injection molding machine, all of the tie rods are secured at their ends to the cylinder base plate and the stationary platen. In the present case, the tie rods 25–28 are secured at their ends by suitable nuts 30-33, respectively. On most occasions, sufficient access is provided to the space between the platens by removing only a single tie rod. However, on some occasions it may be desirable to remove a second tie rod. In the present embodiment, only two of the tie rods, namely 25 and 26 are constructed to be removed. For this purpose, there is provided at each end of these removable tie rods 25 and 26 specially designed cup shaped nuts 30 and 31. The nuts 32 and 33 at the opposite end of the tie rods 27 and 28 may just be conventional nuts. However, it will be understood that the specially designed nuts 30 and 31 could just as easily be used if desired at the ends of tie rods 27 and 28.

Longitudinal movement of the tie rods is further prevented during operation of the molding machine by means of split rings secured against the cylinder base plate 17 and the stationary platen 16 on the sides thereof opposite from the nuts. For example, in FIG. 1, the cylinder base plate 17 and the stationary platen 16 are shown partially in section to shown the split ring pairs 34 and 34a which fit within grooves in the tie rod 25. The halves of split ring 34 are attached together and this split ring abuts cylinder base plate 17. The halves of split ring 34a are secured at their outer peripheries within a recess in the stationary platen 16.

Figure 3:
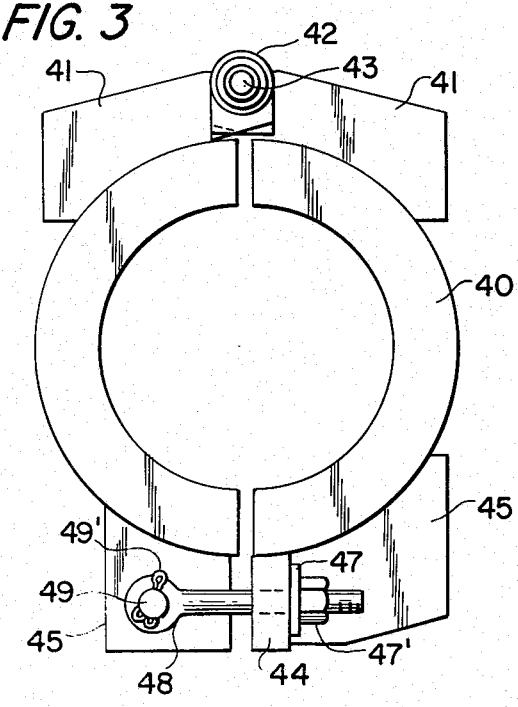
FIG. 3 is an enlarged end elevation view of a tie rod clamp to be used in the present invention.
Figure 4:
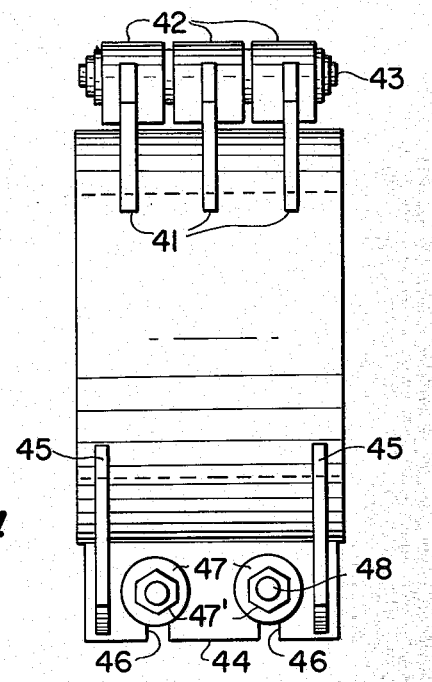
FIG. 4 is a side elevation view of the clamp FIG. 3.

In a manner to be explained below, removal and re-installation of one or more tie rods will require the use of a clamp, and such a clamp is shown in FIGS. 3 and 4. As shown therein, the clamp includes a pair of split clamp halves 40 having flanges 41 welded thereto. Between opposed flanges 41 and rigidly secured thereto are a set of bushings 42 through which extends a pivot pin 43. At the lower end, the clamp includes welded flanges 45 to one of which is connected a cross plate 44 in which slots 46 are provided for receiving bolts 48 which are pivotally mounted on pin 49 by means of cotter pin 49', the pin 49 being secured to one of the flanges 45. Washers and nuts 47 and 47' are also shown. To mount the clamp on any of the tie rods, the two halves 40 are turned about the axis of the pivot pin 43 and placed about a tie rod and closed thereagainst. The bolts 48 are then turned about pin 49 into slots 46 and secured therein by washers 47 and nuts 47'. It will be noted that the radial thickness of the halves 40 is sufficiently large to provide large axial end surfaces against which axially directed forces can be applied without injuring the clamp.

Since on most occasions it is necessary to remove only one tie rod to provide a sufficient space for inserting and removing the mold halves, the description of the operation of the invention will describe the removal and re-installation of only one tie rod. However, as noted above, on other occasions it may be desirable to remove two or possibly also more than two tie rods. Thus, it will be understod that the following discussion and the claims are applicable regardless of the number of tie rods to be removed.

Figure 5A:
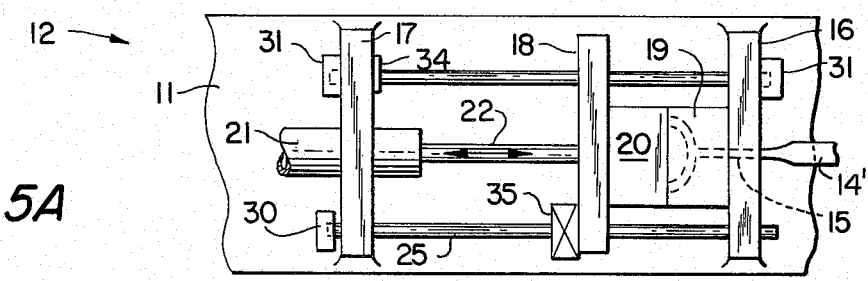
FIGS. 5A through 5F are schematic plan views of the clamping unit showing the operation of the present invention for removing a tie rod.

FIGS. 5A through 5F illustrate the procedure for removing a tie rod, namely the upper left (as viewed in FIG. 2) tie rod 25. These figures illustrate the mold and clamp area 12 in plan view. The base 11 and the barrel 14' are shown in FIG. 5A but these parts have been deleted for clarity in FIG. 5B–5F. In all of FIGS. 5A–5F, an X drawn through a clamp indicates that that particular clamp is tightened onto the tie rod in that particular figure, while the clamps without the X are mounted loosely on the tie rod.

Referring now to FIGS. 5A–5F, and in particular to FIG. 5A, the procedure is shown for removing a tie rod. First, the nut 30 at the platen 16 is removed in a manner to be described in greater detail below. The nut 30 at the cylinder base plate 17 may only be loosened and not necessarily removed. The split ring 34 is now removed to permit movement to the left of the tie rod 25. FIG. 5A shows the tie rod 25 with the right hand nut 30 and the split ring 34 removed, the left nut 30 loosened but in place, and a clamp 35 placed onto rod 25.

At this time, the platen 18 is preferably positioned as close as possible to the platen 16, i.e. with the mold halves 19 and 20 against each other. Clamp 35 is located on the tie rod 25 immediately to the left of platen 18 and tightened thereat. If the nut 30 adjacent cylinder base plate 17 had been removed, further clamp 36 could now be placed loosely onto the tie rod 25 to the left of base plate 17. However, it could be preferable to leave the nut 30 on the left end of tie rod 25 and delay the application of clamp 36 until tie rod 25 has been moved partially to the left. The latter alternative is employed in the present description.

As will be evident from the following discussion, only one of the clamps 35 and 36 will be tightened at any one time. Consequently, only one clamp is actually required. However, it is far more convenient simply to use two separate clamps so that it will only be necessary to tighten one clamp and loosen the other rather than completely change the position of a single clamp between each stage of operation.

Figure 5B:
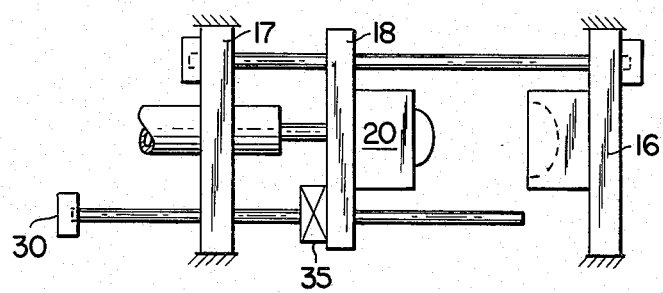
Figure 5C:
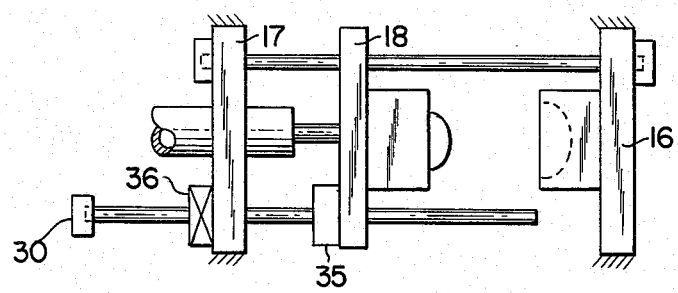
Figure 5D:
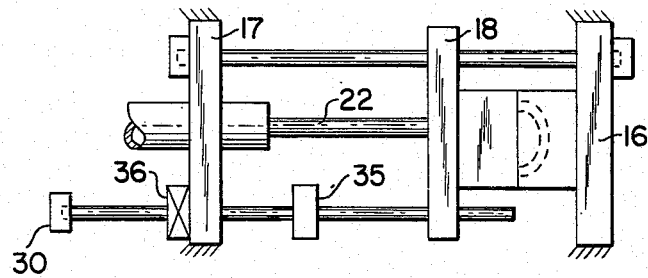
Figure 5E:
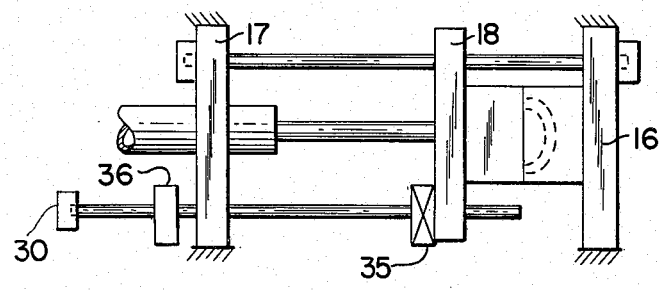

With the clamp 35 in the position as shown in FIG. 5A, the rod 22 is retracted to the position shown in FIG. 5B whereby the movable platen 18 engages the clamp 35 which in turn urges the tie rod 25 to the left to the position shown in FIG. 5B. However, it may be required to move the tie rod 25 even farther to the left relative to movable platen 18 in order to remove the mold 20 (or to mount a new mold at that location). To accomplish this, the clamp 36 is placed directly behind cylinder base plate 17 and tightened and the clamp 35 is loosened. This stage is shown in FIG. 5C. Next, the rod 22 is extended. Since the tie rod 25 is now prevented from moving to the right, the platen 18 slides along rod 25 until it reaches the mold closed position the elements now being positioned as shown in FIG. 5D. The procedure described above for moving the tie rod rearwardly with the movable platen is now repeated. That is, the clamp 36 is loosened and the clamp 35 is again moved against the platen 18 and tightened as shown in FIG. 5E. The rod 22 is then again pulled to the left, again pulling the movable platen 18 and hence also the clamp 35 and the tie rod 25 with it, after which the elements reach the position shown in FIG. 5F. Comparing FIGS. 5B and 5F, it will be noted that the tie rod 25 is now much farther to the left in the latter figure. If still greater clearance is required (for example, if it is desired to locate the right hand end of the tie rod at or substantially flush with the right hand surface of platen 18), then the procedure of FIGS. 5C–5F is repeated as often as necessry. However, it will be apparent that when repeated as often as necessarry. However, it will be apparent that when repeating this process starting from the FIG. 5F position, care must be taken when moving the movable platen 18 to the right, along the fixed tie rod 25 to be sure that the platen moves no farther than the end thereof.

Figure 5F:
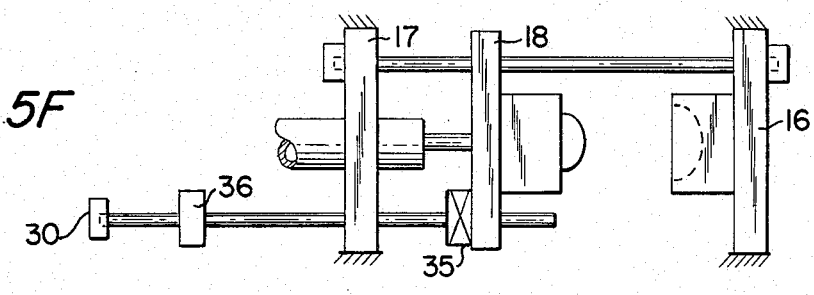

Assuming now that the position of the elements shown in FIG. 5F is adequate for removal of mold halves 19 and 20 and also for mounting of new mold halves 23 and 24 for the next molding job, the said mold halves 19 and 20 are thus removed and the new mold halves 23 and 24 are mounted on the platens 18 and 16, respectively.

Figure 6A:
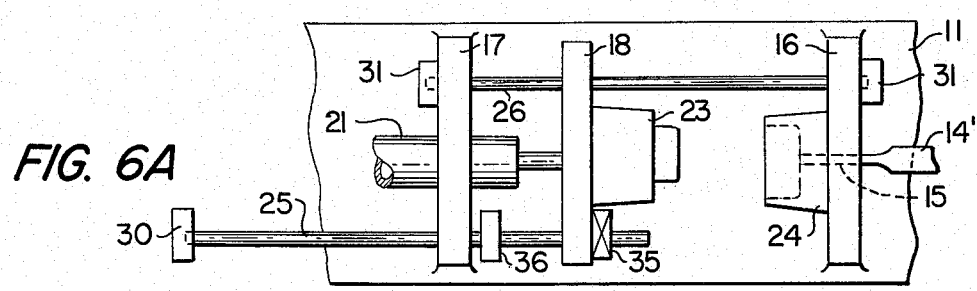
FIGS. 6A through 6F are schematic plan views similar to FIG. 5 and showing the operation of the invention for re-installing a tie rod.
Figure 6B:
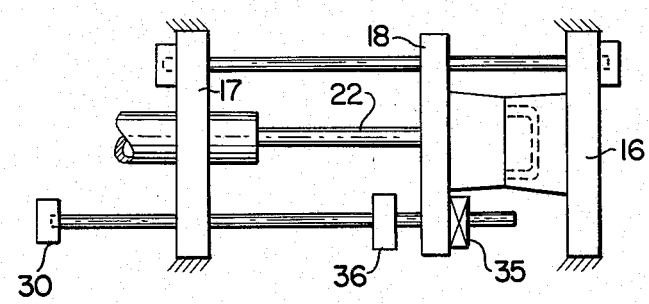
Figure 6C:
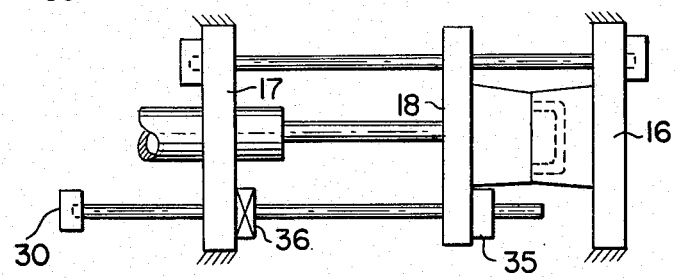
Figure 6D:
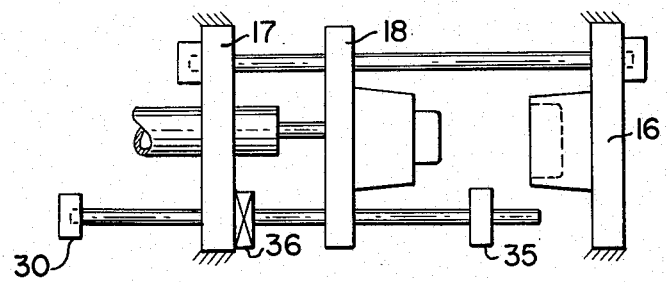
Figure 6E:
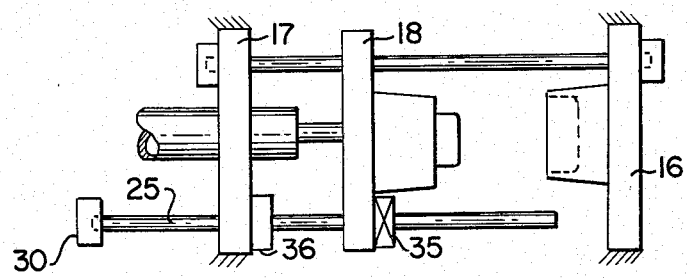
Figure 6F:
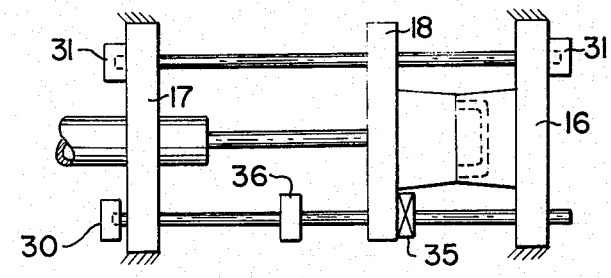

FIGS. 6A–6F illustrate the procedure for re-installing the tie rod 25. As with FIGS. 5A–5F, the base 11 and the barrel 14' are shown schematically only in FIG. 6A, these parts being deleted for purposes of clarity in the remaining ones of FIGS.. 6B–6F. Essentially, it will be understood that the procedure for re-installing the tie rod is essentially the reverse of the removal process of FIGS. 5A–5F. In FIG. 6A, the elements are in the same position as shown in FIG. 5F. In this case, however, the clamps 35 and 36 are mounted on the right hand side of platen 18 and base plate 17, respectively, rather than the left hand side thereof as in FIG. 5A–5F. Firstly, clamp 35 is tightened and the piston 22 moved to the right to the position of FIG. 6B. Next, clamp 35 is loosened and 36 tightened against base plate 17 as shown in FIG. 6C, whereupon the platen 18 is moved back to the left to the position of FIG. 6D. Clamp 35 is then again moved against platen 18 and tightened and the clamp 36 loosened as shown in FIG. 6E. Movable platen 18 is then once again moved to the right until the right hand end of rod 25 moves through its opening in stationary platen 16 to the position of FIG. 6F. The clamps 35 and 36 are then removed, the split rings 34 and 34a are applied and the tie rod nuts are tightened A feature of the present invention includes the method and arrangement for loosening and tightening the tie rod nuts. This feature will now be explained with reference to FIGS. 7–10.

All features illustrated and described with respect to the platen 16 for the purpose of loosening and tightening the tie rod nuts would also be present on the cylinder base plate 17.

Figure 9:
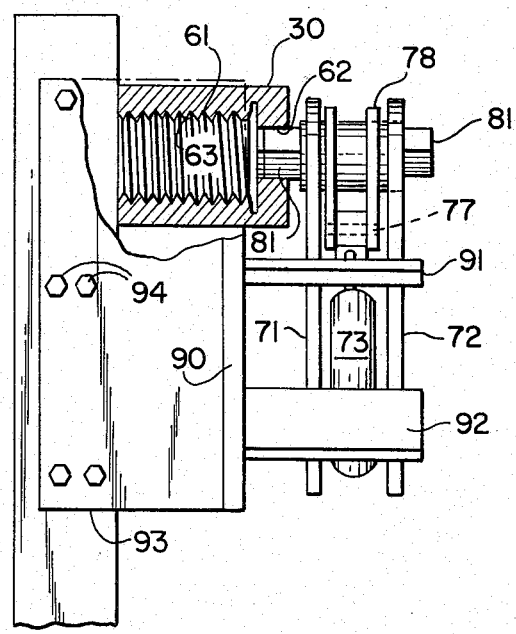
FIG. 9 is a side elevational view taken along line 9A—9A of FIG. 8 with the tie rod beng shown in section along line 9B—9B of FIG. 8.

As shown in FIGS. 1 and 9, the special nut 30 is essentially cup shaped and includes a threaded interior 61 which mates with the threaded end of the respective tie rod 25. An axially extended channel 62 extends inwardly from the outer end of the cup shaped nut, preferably to the bottom of the interior thereof. This channel is shaped to mate with a wrench to be described below, and preferably it will be square in cross section as shown in FIG. 2.

Figure 7:
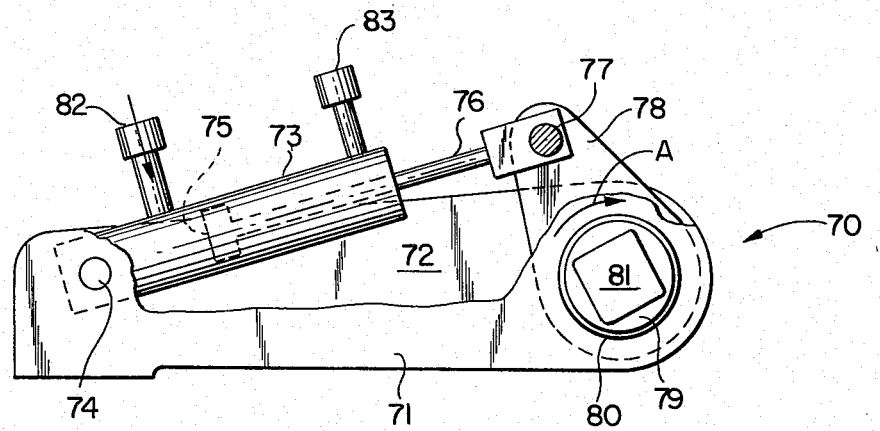
FIG. 7 is an enlarged side elevational view of a known hydraulic torque wrench adapted for use with the present invention, a portion thereof being broken away to show more clearly certain portions thereof.

As noted earlier, it is most difficult to provide just the correct amount of torquing to the nut whnen removing and retightening it. To solve this problem, a nut and associated bracket plate structure was designed for use with a hydraulic torque wrench, such a wrench having been known per se but not for use in the present environment. On example of such a wrench is the Biach wrench made by Biach Industries, Incorporated. Referring to FIG. 7, this hydraulic torque wrench 70 includes a pair of side plates 71 and 72. A cylinder 73 includes therein a piston head 75 connected to a piston rod 76, the opposite end of which is articulated at 77 to a crank member 78 which includes projections 79 on both sides thereof journaled for rotation in respective openings 80 in the side plates 71 and 72 (only the former being visible in FIG. 7). Attached to each projection 79 is a square end 81 which is adapted to project into opening 62. Consequently, by extending piston 75 within the cylinder 73, the square projection 81 is turned in the direction indicated by the arrow A. Piston 75 is extended by feeding hydraulic fluid through opening 82 and returned by pneumatic pressure via opening 83.

Figure 10:
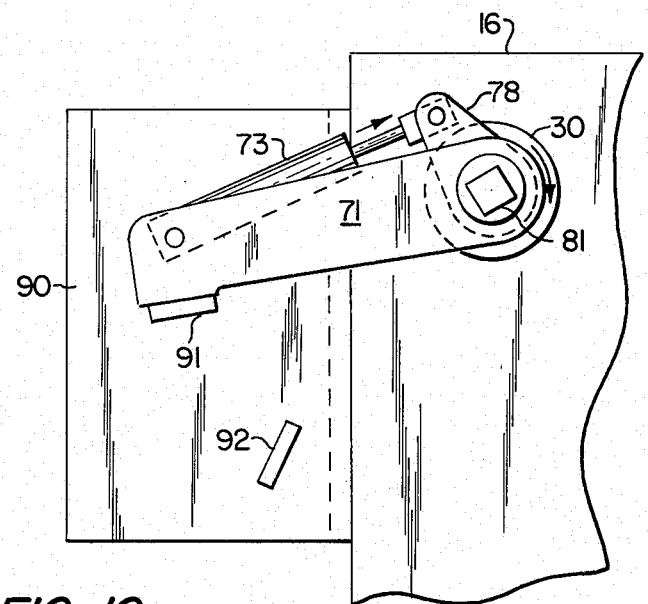
FIG. 10 is a partial enlarged view similar to FIG. 8 but showing schematically the torque wrench of FIG. 7 as used for torquing the tie rod nut.
Figure 8:
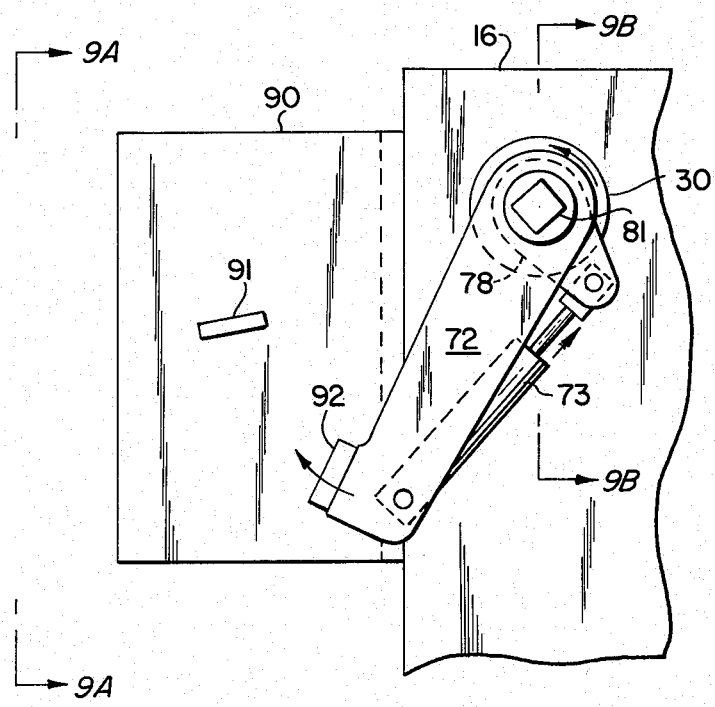
FIG. 8 is a partial, enlarged end elevation view of the stationary platen showing schematically the torque wrench of FIG. 7 as used for detorquing a tie rod nut.

The operation of the hydraulic torque wrench will now be described with respect to FIGS. 8 through 10. To provide a reaction surface against which the torque wrench 70 can act, there is provided on the stationary platen 16 adjacent the nut 30 a bracket plate 90 having extending outwardly therefrom reaction rods 91 and 92. These rods may be welded to the bracket plate 90. The bracket plate 90 is L-shaped, and as shown in FIG. 9, the side 93 of the bracket plate 90 extending generally parallel to the tie rods is connected to the side of the stationary platen 16 by suitable means such as bolts 94. It will be understood that a suitable reaction structure including such elements 90–94 would be provided adjacent the nuts of any tie rod which it is contemplated should be removable. However, since the structure would be essentially the same at all locations, it is sufficient to shown only one such reaction structure herein.

As is evident from the preceding discussion, the hydraulic torque wrench exerts a torque only in one direction. Therefore, the torque wrench must be turned completely over when switching between the torquing position and the detorquing position. For example, FIG. 8 illustrates the position of the torque wrench 70 for detorquing the nut 30. In this case, the bottom surface of torque wrench 70 reacts against the rod 92 while the piston within cylinder 73 is extended to turn the crank arm 78, the square end 81 and hence also the nut 30 counterclockwise. To tighten the nut 30, the torque wrench is turned completely around as shown in FIG. 10 wherein the bottom of the torque wrench reacts against reaction rod 91, the piston within cylinder 73 acting on the crank arm 78 to turn it along with the square end 81 and the nut 30 clockwise.

Although the invention has been described in considerable detail with respects to preferred embodiments thereof, it will be apparent that the invention is capable of numerous modifications of variations apparent to those skilled in the art without departing from the spirit and scope of the invention.

We claim:

1. A method of moving a tie rod longitudinally along its axis in an injection molding apparatus of the type including a stationary platen and a movable platen carrying mating mold halves, a stationary cylinder base plate on the side of the movable platen opposite from the stationary platen, a plurality of tie rods extending between the stationary platen and the cylinder base plate with the movable platen movably mountd on said tie rods, coupling means fixedly connecting the tie rods against movement relative to the cylinder base plate and the stationary platen, and a power means for moving the movable platen along the tie rods towards and away from the stationary platen to close and open the mold halves, comprising the steps of: securing a releasable clamp onto a tie rod adjacent the movable platen, on the side thereof facing the cylinder base plate, disconnecting the tie rod at the stationary platen so as to permit movement of the tie rod in a direction from the stationary platen towards the cylinder base plate, and moving the movable platen longitudinally towards the cylinder base plate to move it against the clamp to thus move the clamp which in turn moves the tie rod longitudinally with it.

2. The method of claim 1, including, following the said moving step:

securing a releasable clamp onto the tie rod adjacent the cylinder base plate on the side thereof facing away from the platens, and then moving the movable platen towards the stationary platen wherein the movable platen moves along the tie rod which is prevented from moving in that direction longitudinally by the engagement of the last said clamp secured onto the tie rod at the cylinder base plate, and then again securing aa releasable a onto the tie rod adjacent the movable platen on the side thereof facing the cylinder base plate, this being a point on the tie rod closer to the said end of the tie rod then during the first said securing step, and then again moving the movable platen towards the cylinder base plate to move the tie rod longitudinally therewith to move the said end thereof farther away from the stationary platen.

3. The method according to claim 2, including repeating all of the above said securing and moving steps until the said end of the tie rod has reached the movable platen, thereby providing maximum access to the space between the movable and the stationary platen for insertion and removal of mold halves.

4. The method of claim 1, including, positioning the movable platen, prior to said securing step, to a position closest to the stationary platen whereat the mold halves are substantially closed upon each other, said securing step including securing the releasable clamp onto the tie rod immediately adjacent the movable platen while it is at said position, and said moving step including operating the power means for moving the movable platen for its full stroke towards the cylinder base plate, the movable platen thus moving the tie rod longitudinally with it for a distance equal to the said full stroke of the power means.

5. The method according to claim 4, including, after the said moving step, securing a releasable clamp onto the tie rod immediately adjacent the cylinder base plate on the side thereof facing away from the platens, and then operating the power means to move the movable platen the full stroke of the power means towards the stationary platen until the mold closes, wherein the movable platen moves along the tie rod which is prevented from moving in that direction longtudinally by the engagement of the last said clamp secured onto the tie rod at the cylinder base plate, and then again securing a releasable clamp onto the tie rod immediately adjacent the movable platen on the side thereof facing the cylinder base plate, this being a point on the tie rod closer to the said end of the tie rod then during the first securing step, and then again moving the movable platen towards the cylinder base plate to move the tie rod longitudinally therewith to move the said end thereof farther away from the stationary platen.

6. The method of claim 4, wherein said disconnecting step includes engaging the nut at a end of the tie rod located at the stationary platen by engaging the nut with a hydraulic torque wrench, the opposed ends of which wrench react at one end against the nut and at the other end against a fixed bracket plate.

7. The method of claim 1
including returning the said end of the tie rod towards the stationary platen by securing a releasable clamp onto the tie rod on the side of the movable platen towards the stationary platen and moving the platen toward the stationary platen, wherein the movable platen engages the clamp which in turn moves the tie longitudinally with it.

8. A method of returning to its operative position a tie rod which has been removed longitudinally therefrom by moving the tie rod longitudinally along its axis in an injection molding apparatus of the type including a stationary platen and a movable platen carrying mating mold halves, a stationary cylinder base plate on the side of the movable platen opposite from the stationary plate, a plurality of the rods extending between the stationary platen and the cylinder base plate with the movable platen movably mounted on said tie rods, coupling means adapted to fixedly connect the tie rods against movement relative to the cylinder base plate and the stationary platen in their operative position, and a power means for moving the movable platen along the tie rods towards and away from the stationary platen to close and open the mold halves, comprising the steps of:

securing a clamp onto the removed tie rod adjacent the movable platen on the side thereof facing the stationary platen, moving the movable platen towards the stationary platen to engage the clamp which in turn moves the tie rod longitudinally with it, and connecting the coupling means to fix the tie rod against movement relative to the stationary platen.

9. The method of claim 8, including, after the said moving step and before said connecting step,
securing a releasable clamp onto the tie rod adjacent the cylinder base plate on the side thereof facing the platens, and then moving the movable platen toward the cylinder base plate wherein the movable platen moves along the tie rod which is prevented from moving in that direction longitudinally by the engagement of the last said clamp secured onto the tie rod at the cylinder base plate, and then again securing a clamp onto the tie rod adjacent the movable platen on the side thereof facing the stationary platen, this being a point on the tie rod farther from the said end of the tie rod then during the first said securing step, and then again moving the movable platen towards the stationary platen to move the tie rod longitudinally therewith to move the said end thereof closer to th stationary platen.

10. The method of claim 9, including repeating all of the above said securing and moving steps until the said end of the tie rod has reached and passed through the stationary platen, 11. The method according to claim 8, wherein the step of connecting the end of the tie rod at the stationary platen includes engaging said end with a nut and tightening the nut to a controlled torque with a hydraulic torque wrench, the opposed end of which wrench reacts at one end against the nut and at the other end against a fixed bracket.

12. The method according to claim 8, operating said power means to move the movable platen for the full stroke of said power means towards the stationary platen to engage the clamp which in turn moves the tie rod longitudinally for said full stroke of the power means.

13. The method according to claim 12, including, after the said moving step, securing a releasable clamp onto the tie rod immediately adjacent the cylinder base plate on the side thereof facing towards the platens, and then operating the power means to move the movable platen for the full stroke of the power means towards the cylinder base plate wherein the movable platen moves along the tie rod which is prevented from moving in that direction by the engagement of the last said clamp secured onto the tie rod at the cylinder base plate, and then again securing a clamp onto the tie rod immediately adjacent the movable platen on the side thereof facing the stationary platen, this being a point on the tie rod farther from the said end of the tie rod then during the first said securing step, and then again moving the movable platen towards the stationary platen to move the tie rod longitudinally therewith to move the said end thereof closer to the stationary platen.

* * * * *

UNITED STATES PATENT AND TRADEMARK OFFICE
CERTIFICATE OF CORRECTION

PATENT NO. : 3,882,588
DATED : May 13, 1975
INVENTOR(S) : Patrick M. McFalls, David W. McCarty and Robert B. Hare It is certified that error appears in the above-identified patent and that said Letters Patent are hereby corrected as shown below:

Column 8, line 32, "aa" should read --a-- and "a" should read --clamp--.

Column 9, line 16, "the" should read --a-- and "a" should read --the--.

line 21, Please insert --and further-- immediately following "claim 1"

line 26, Please insert --movable-- between "the" and "platen".

line 36, "plate" should read --platen-- and insert --tie-- between "the" and "rods".

Column 10, Line 28, Please insert --said moving step including-- between "claim 8" and "operating".

Signed and Sealed this twenty-third Day of September 1975

[SEAL]

Attest:

RUTH C. MASON
Attesting Officer

C. MARSHALL DANN
Commissioner of Patents and Trademarks